(12) United States Patent
Kim et al.

(10) Patent No.: US 7,497,615 B2
(45) Date of Patent: Mar. 3, 2009

(54) DIGITAL TEMPERATURE SENSOR, AND SYSTEM AND METHOD FOR MEASURING TEMPERATURE

(75) Inventors: Dong-kyun Kim, Suwon-si (KR); Ja-nam Ku, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 269 days.

(21) Appl. No.: 11/188,007

(22) Filed: Jul. 25, 2005

(65) Prior Publication Data
US 2006/0018364 A1 Jan. 26, 2006

(30) Foreign Application Priority Data
Jul. 23, 2004 (KR) .................. 10-2004-0057555

(51) Int. Cl.
*G01K 7/16* (2006.01)
*H03K 3/00* (2006.01)

(52) U.S. Cl. .................. 374/170; 374/185; 374/183; 327/512; 702/134

(58) Field of Classification Search .............. 374/170, 374/185, 183
See application file for complete search history.

(56) References Cited

U.S. PATENT DOCUMENTS

| | | | | |
|---|---|---|---|---|
| 2,593,897 A * | 4/1952 | Knudsen | .................. | 374/111 |
| 3,685,043 A * | 8/1972 | Kosakowski | .............. | 341/157 |
| 3,791,214 A * | 2/1974 | Keith | .................. | 374/164 |
| 4,110,746 A * | 8/1978 | Furukawa et al. | .......... | 341/140 |
| 4,114,442 A * | 9/1978 | Pratt | .................. | 374/113 |
| 4,122,719 A * | 10/1978 | Carlson et al. | .............. | 374/167 |
| 4,130,019 A * | 12/1978 | Nitschke | .................. | 374/110 |
| 4,270,119 A * | 5/1981 | Mitamura | .................. | 341/167 |
| 4,340,886 A * | 7/1982 | Boldt et al. | .................. | 340/682 |
| 4,448,549 A * | 5/1984 | Hashimoto et al. | .......... | 374/170 |
| 4,480,312 A * | 10/1984 | Wingate | .................. | 702/130 |
| 4,592,000 A * | 5/1986 | Ishizaka et al. | ............. | 702/131 |
| 4,602,871 A * | 7/1986 | Hanaoka | .................. | 374/102 |
| 4,788,398 A * | 11/1988 | Hornung | .................. | 219/483 |
| 4,847,783 A * | 7/1989 | Grace et al. | .................. | 702/24 |
| 5,019,760 A * | 5/1991 | Chu et al. | .................. | 318/490 |
| 5,317,520 A * | 5/1994 | Castle | .................. | 702/58 |
| 6,695,475 B2 * | 2/2004 | Yin | .................. | 374/171 |

* cited by examiner

*Primary Examiner*—Gail Verbitsky
*Assistant Examiner*—Mirellys Jagan
(74) *Attorney, Agent, or Firm*—Sughrue Mion, PLLC

(57) ABSTRACT

A digital temperature sensor and a system and a method for measuring a temperature are provided. The system includes a reference signal generator including one or more resistance elements; a temperature sensor including a plurality of discrete resistance elements arranged parallel with one another; a multiplexer multiplexing the plurality of discrete resistance elements and the reference resistance element so that the plurality of discrete resistance elements sequentially distribute a power voltage together with the reference resistance element; a comparator having the voltages distributed by the reference resistance element and a discrete resistance element selected by the multiplexer; and a counter counting sequential switchings of the multiplexer. The counter information of the output level transit time of the comparator is provided to the controller, and the system obtains temperature information according to temperature change information from turn information of the discrete resistance elements according to the counter information.

17 Claims, 5 Drawing Sheets

$V_{out}$ (20°C) = 1 Volt
$V_{out}$ (21°C) ≅ 1.0019 Volt

FIG. 5

| No. | 1.0 | 2.0 | 3.0 | 4.0 | 5.0 | 6.0 | 7.0 | 8.0 |
|---|---|---|---|---|---|---|---|---|
| L | 7794.0 | 7788.0 | 7782.0 | 7776.0 | 7770.0 | 7764.0 | 7758.0 | 7752.0 |
| ......... | | | | | | | | |
| T, °C | R_01 | R_02 | R_03 | R_04 | R_05 | R_06 | R_07 | R_08 |
| 20.0 | 96126.4 | 96052.0 | 95977.7 | 95903.5 | 95829.4 | 95755.5 | 95681.6 | 95607.9 |
| 30.0 | 100000.0 | 99922.6 | 99845.3 | 99768.1 | 99691.1 | 99614.1 | 99537.3 | 99460.6 |
| 30.2 | 100077.5 | 100000.0 | 99922.6 | 99845.4 | 99768.3 | 99691.3 | 99614.4 | 99537.7 |
| 30.4 | 100154.9 | 100077.4 | 100000.0 | 99922.7 | 99845.5 | 99768.5 | 99691.5 | 99614.7 |
| 30.6 | 100232.4 | 100154.8 | 100077.4 | 100000.0 | 99922.8 | 99845.7 | 99768.7 | 99691.8 |
| 30.8 | 100309.9 | 100232.2 | 100154.7 | 100077.3 | 100000.0 | 99922.8 | 99845.8 | 99768.8 |
| 31.0 | 100387.4 | 100309.6 | 100232.1 | 100154.6 | 100077.2 | 100000.0 | 99922.9 | 99845.9 |
| 31.2 | 100464.8 | 100387.1 | 100309.4 | 100231.9 | 100154.5 | 100077.2 | 100000.0 | 99922.9 |
| 31.4 | 100542.3 | 100464.5 | 100386.8 | 100309.2 | 100231.7 | 100154.3 | 100077.1 | 100000.0 |
| 31.6 | 100619.8 | 100541.9 | 100464.1 | 100386.5 | 100308.9 | 100231.5 | 100154.2 | 100077.1 |

FIG. 6

| T,℃ | R_01 | R_2 | R_03 | R_04 | R_05 | R_06 | R_07 | R_08 | R_09 | R_10 | R_11 | R_12 | R_13 | R_14 | R_15 | R_16 | R_17 | R_18 | R_19 | R_20 | R_21 |
|---|---|---|---|---|---|---|---|---|---|---|---|---|---|---|---|---|---|---|---|---|---|
| 20 | 5841.9 | 5834.3 | 5826.6 | 5819.0 | 5811.3 | 5803.7 | 5796.1 | 5788.6 | 5781.0 | 5773.5 | 5766.0 | 5758.5 | 5751.0 | 5743.6 | 5736.2 | 5728.8 | 5721.4 | 5714.0 | 5706.7 | 5699.3 | 5692.0 |
| 30 | 6000.0 | 5992.1 | 5984.3 | 5976.4 | 5968.6 | 5960.7 | 5953.0 | 5945.2 | 5937.4 | 5929.7 | 5922.0 | 5914.3 | 5906.6 | 5899.0 | 5891.4 | 5883.8 | 5876.2 | 5868.6 | 5861.0 | 5853.5 | 5846.0 |
| 30.5 | 6007.9 | 6000.0 | 5992.1 | 5984.3 | 5976.4 | 5968.6 | 5960.8 | 5953.0 | 5945.3 | 5937.5 | 5929.8 | 5922.1 | 5914.4 | 5906.8 | 5899.1 | 5891.5 | 5883.9 | 5876.3 | 5868.8 | 5861.2 | 5853.7 |
| 31 | 6015.8 | 6007.9 | 6000.0 | 5992.1 | 5984.3 | 5976.4 | 5968.6 | 5960.8 | 5953.1 | 5945.3 | 5937.6 | 5929.9 | 5922.2 | 5914.5 | 5906.9 | 5899.3 | 5891.6 | 5884.1 | 5876.5 | 5868.9 | 5861.4 |
| 31.5 | 6023.7 | 6015.8 | 6007.9 | 6000.0 | 5992.1 | 5984.3 | 5976.5 | 5968.7 | 5960.9 | 5953.1 | 5945.4 | 5937.7 | 5930.0 | 5922.3 | 5914.6 | 5907.0 | 5899.4 | 5891.8 | 5884.2 | 5876.6 | 5869.1 |
| 32 | 6031.6 | 6023.7 | 6015.8 | 6007.9 | 6000.0 | 5992.1 | 5984.3 | 5976.5 | 5968.7 | 5960.9 | 5953.2 | 5945.5 | 5937.8 | 5930.1 | 5922.4 | 5914.8 | 5907.1 | 5899.5 | 5891.9 | 5884.4 | 5876.8 |
| 32.5 | 6039.5 | 6031.6 | 6023.6 | 6015.7 | 6007.9 | 6000.0 | 5992.2 | 5984.3 | 5976.5 | 5968.8 | 5961.0 | 5953.3 | 5945.5 | 5937.8 | 5930.2 | 5922.5 | 5914.9 | 5907.2 | 5899.6 | 5892.1 | 5884.5 |
| 33 | 6047.4 | 6039.5 | 6031.5 | 6023.6 | 6015.7 | 6007.9 | 6000.0 | 5992.2 | 5984.4 | 5976.6 | 5968.8 | 5961.1 | 5953.3 | 5945.6 | 5937.9 | 5930.3 | 5922.6 | 5915.0 | 5907.4 | 5899.8 | 5892.2 |
| 33.5 | 6055.3 | 6047.4 | 6039.4 | 6031.5 | 6023.6 | 6015.7 | 6007.8 | 6000.0 | 5992.2 | 5984.4 | 5976.6 | 5968.8 | 5961.1 | 5953.4 | 5945.7 | 5938.0 | 5930.3 | 5922.7 | 5915.1 | 5907.5 | 5899.9 |
| 34 | 6063.2 | 6055.2 | 6047.3 | 6039.4 | 6031.4 | 6023.6 | 6015.7 | 6007.8 | 6000.0 | 5992.2 | 5984.4 | 5976.6 | 5968.9 | 5961.2 | 5953.4 | 5945.8 | 5938.1 | 5930.4 | 5922.8 | 5915.2 | 5907.6 |
| 34.5 | 6071.1 | 6063.1 | 6055.2 | 6047.2 | 6039.3 | 6031.4 | 6023.5 | 6015.7 | 6007.8 | 6000.0 | 5992.2 | 5984.4 | 5976.7 | 5968.9 | 5961.2 | 5953.5 | 5945.8 | 5938.2 | 5930.5 | 5922.9 | 5915.3 |
| 35 | 6079.0 | 6071.0 | 6063.1 | 6055.1 | 6047.2 | 6039.3 | 6031.4 | 6023.5 | 6015.6 | 6007.8 | 6000.0 | 5992.2 | 5984.4 | 5976.7 | 5969.0 | 5961.3 | 5953.6 | 5945.9 | 5938.2 | 5930.6 | 5923.0 |
| 35.5 | 6086.9 | 6078.9 | 6070.9 | 6063.0 | 6055.0 | 6047.1 | 6039.2 | 6031.3 | 6023.5 | 6015.6 | 6007.8 | 6000.0 | 5992.2 | 5976.7 | 5976.7 | 5969.0 | 5961.3 | 5953.6 | 5946.0 | 5938.3 | 5930.7 |
| 36 | 6094.8 | 6086.8 | 6078.8 | 6070.8 | 6062.9 | 6055.0 | 6047.0 | 6039.2 | 6031.3 | 6023.4 | 6015.6 | 6007.8 | 6000.0 | 5984.5 | 5984.5 | 5976.8 | 5969.0 | 5961.4 | 5953.7 | 5946.0 | 5938.4 |
| 36.5 | 6102.7 | 6094.7 | 6086.7 | 6078.7 | 6070.8 | 6062.8 | 6054.9 | 6047.0 | 6039.1 | 6031.3 | 6023.4 | 6015.6 | 6007.8 | 5992.2 | 5992.2 | 5984.5 | 5976.8 | 5969.1 | 5961.4 | 5953.7 | 5946.1 |
| 37 | 6110.6 | 6102.6 | 6094.6 | 6086.6 | 6078.6 | 6070.7 | 6062.7 | 6054.8 | 6047.0 | 6039.1 | 6031.2 | 6023.4 | 6015.6 | 6007.8 | 6000.0 | 5992.3 | 5984.5 | 5976.8 | 5969.1 | 5961.5 | 5953.8 |
| 37.5 | 6118.5 | 6110.5 | 6102.5 | 6094.5 | 6086.5 | 6078.5 | 6070.6 | 6062.6 | 6054.7 | 6046.9 | 6039.0 | 6031.2 | 6023.3 | 6015.5 | 6007.8 | 6000.0 | 5992.3 | 5984.5 | 5976.8 | 5969.2 | 5961.5 |
| 38 | 6126.4 | 6118.4 | 6110.3 | 6102.3 | 6094.3 | 6086.4 | 6078.4 | 6070.5 | 6062.6 | 6054.7 | 6046.9 | 6039.0 | 6031.1 | 6023.3 | 6015.5 | 6007.7 | 6000.0 | 5992.3 | 5984.6 | 5976.8 | 5969.2 |
| 38.5 | 6134.3 | 6126.3 | 6118.2 | 6110.2 | 6102.2 | 6094.2 | 6086.2 | 6078.3 | 6070.4 | 6062.5 | 6054.6 | 6046.7 | 6038.9 | 6031.1 | 6023.3 | 6015.5 | 6007.7 | 6000.0 | 5992.3 | 5984.6 | 5976.9 |
| 39 | 6142.2 | 6134.2 | 6126.1 | 6118.1 | 6110.1 | 6102.1 | 6094.1 | 6086.1 | 6078.2 | 6070.3 | 6062.4 | 6054.5 | 6046.7 | 6038.8 | 6031.0 | 6023.2 | 6015.5 | 6007.7 | 6000.0 | 5992.3 | 5984.6 |
| 39.5 | 6150.2 | 6142.1 | 6134.0 | 6125.9 | 6117.9 | 6109.9 | 6101.9 | 6094.0 | 6086.0 | 6078.1 | 6070.2 | 6062.3 | 6054.5 | 6046.6 | 6038.8 | 6031.0 | 6023.2 | 6015.4 | 6007.7 | 6000.0 | 5992.3 |
| 40 | 6158.1 | 6150.0 | 6141.9 | 6133.8 | 6125.8 | 6117.8 | 6109.8 | 6101.8 | 6093.8 | 6085.9 | 6078.0 | 6070.1 | 6062.2 | 6054.4 | 6046.6 | 6038.7 | 6031.0 | 6023.2 | 6015.4 | 6007.7 | 6000.0 |

DIGITAL TEMPERATURE SENSOR, AND SYSTEM AND METHOD FOR MEASURING TEMPERATURE

CROSS-REFERENCE TO RELATED APPLICATIONS

This application claims priority from Korean Patent Application No. 2004-57555 filed on Jul. 23, 2004 in the Korean Intellectual Property Office, the disclosure of which is incorporated herein by reference.

BACKGROUND OF THE INVENTION

1. Field of the Invention

The present invention relates generally to a digital temperature sensor. More particularly, the present invention relates to a digital temperature sensor digitally displaying a temperature measured depending on a slight variation in a resistance value without using an analog-to-digital converter, and a system and a method for measuring a temperature using the digital temperature sensor.

2. Description of the Related Art

Temperature sensors are widely used in various industry fields. For example, temperature sensors are used to precisely produce products in precision industries, such as the semiconductor industry, as well as to control a temperature in electric home appliances such as air conditioners, refrigerators, or the like.

Currently used thermometers are classified according to the following measurement principles.

There are thermometers which use thermal expansion, for example, gas thermometers, liquid thermometers, and bimetal thermometers. The liquid thermometers include thermometers using mercury or kerosene. In the past, most alcohol thermometers (using alcohol dyed red) have red liquid columns. However, condensation easily occurs in an upper space of the liquid column, which generates an error in an indicator. Thus, the liquid thermometers have used kerosene for the past 30 years. Liquid thermometers include home thermometers clinical thermometers, maximum-minimum thermometers and Beckman's thermometers. The bimetal thermometers use bimetal made by adhering two types of metal plates having different expansion coefficients, i.e., copper and nickel thin plates. In the bimetal thermometers, the expansion coefficient of the copper is greater than that of the nickel. Thus, when a temperature is high, the nickel plate is bent. When the temperature is low, the copper plate is bent. The bimetal thermometers display the temperature using this principle.

There are thermal resistance thermometers using temperature variations in an electric resistance. The thermal resistance thermometers include resistance thermometers using a property that electric resistance values of metal and semiconductor depend on a temperature.

In thermocouple thermometers, both ends of two types of metals or alloy wires contact to make a loop-shaped circuit through which electricity flows. If a temperature difference is given to the contacting ends, a thermoelectromotive force is generated at the contacting ends, and thus a current flows in the contacting ends. This is called Peltier effect (thermoelectric effect). The thermocouple thermometers utilize the Peltier effect. Potentiometers or millivoltmeters having great internal resistances measure the thermoelectromotive force and are widely used for measuring a temperature during compensation of the temperature and the thermoelectromotive force. This is because of a small error in heat capacity and a superior response to heat due to the very small volume of a metal junction that senses humidity. Examples of a thermocouple include a couple of platinum wire and alloy wire of platinum and rhodium, a couple of copper wire and constantan wire, and the like.

There are color thermometers depending on light. Examples of the color thermometers include optical pyrometers and radiation pyrometers. The optical pyrometers compare color temperatures of objects to be measured with a standard color temperature to measure a temperature, i.e., may measure a color temperature between 700° C. and 2500° C. In the radiation pyrometers, thermal energy radiated from an object to be measured is condensed using a lens or a concave mirror and a thermistor (a resistor sensitive to a room temperature) is put on a focus to measure a temperature depending on variations of a resistance value caused by a rise in the temperature of thermistor. An example of the radiation pyrometers includes thermography thermometers using a semiconductor thermosensitive device for infrared rays. A distribution of a surface temperature of the earth or the skin temperature of the human body is investigated from an artificial satellite using the thermography thermometer.

There are segercone thermometers and thermocolor thermometers. The segercone thermometers are about-10-cm-triangle cones made by kneading silicate and metal oxide. The segercone thermometers are used to investigate temperature distribution in a furnace by disposing and heating triangle cones and observing a melting degree of the triangle cones. The thermocolor thermometers use a principle of a change in a color of a thermocolor called heat sensitive paint. The thermocolor thermometers use a phenomenon of a reversible change in a color of complex salt such as cobalt, chrome, or the like depending on temperature. The complex salt is kneaded with clay and then dried to make thermoclay. Liquid crystal thermometers using a temperature characteristic of a liquid crystal are recently released as the thermocolor thermometers.

The thermal resistance thermometers use a property that an electric resistance of a conductor varies with variations in temperature, i.e., a property that a corresponding temperature can be measured using a variation rate of a resistance with respect to variations in unit temperature. The variation rate of resistance with respect to the unit temperature is called a temperature coefficient of resistance (TCR). If a resistance value is increased with an increase in temperature, the variation rate of resistance is called a positive TCR. If the resistance value is reduced, the variation rate of resistance is called a negative TCR. A metallic material used for measuring a temperature mainly has a positive TCR. Examples of the metallic material include platinum, nickel, copper, and the like. As a material is pure, a TCR of the material is increased and constant. William Siemens first manufactured a resistance thermometer using platinum to measure a temperature in 1871. As previously described, resistance values of all kinds of metals depend on temperature as shown in Table 1 below.

TABLE 1

| Material | Resistance (uΩm) | TCR (ppm/° C.) |
| --- | --- | --- |
| Carbon (graphite) | 1,390 | −500 |
| Manganin (alloy) | 48.2 | 2 |
| Nichrome | 101 | 1,700 |
| Chromium | 12.9 | 3,000 |
| Aluminum | 2.83 | 3,600 |
| Silver | 1.63 | 3,800 |
| Copper | 1.72 | 3,900 |

TABLE 1-continued

| Material | Resistance (uΩm) | TCR (ppm/° C.) |
|---|---|---|
| Platinum | 10.6 | 3,927 |
| Tungsten | 4.20 | 4,500 |
| Iron | 9.71 | 6,510 |
| Nickel | 6.84 | 6,900 |
| Gold | 2.40 | 8,300 |

Sensors made of a metal such as nickel, copper, platinum, or the like and an alloy have been developed using a dependence of a resistance value of a metal on temperature as shown in Table 1. However, platinum is mainly used due to its superior stability and good TCR. A platinum temperature sensor is used as a standard temperature sensor in a temperature area between −260° C. and 630° C. due to its high accuracy.

FIG. 1 is a block diagram of a conventional digital temperature measuring system using a platinum resistance. The conventional digital temperature measuring system includes stationary and variable resistors $R_0$ and $R(T)$ connected to each other in serial, a direct current (DC) offset removing circuit 10, an amplifier 20, an analog-to-digital converter (ADC) 30, a digital display 40, and a controller 50.

The stationary resistor is set so that its resistance value $R_0$ is kept at a reference temperature $T_0$, mainly at a room temperature of 20° C., and the variable resistor is set so that its resistance value $R(T)$ varies with a temperature. The resistance value $R(T)$ of the variable resistor at a temperature $T°$ C. can be expressed as in Equation 1:

$$R(T)=R_0[1+\alpha(T-T_0)] \quad \text{[Equation 1]}$$

where $R(T)$ denotes a loadless resistance value Ω of the variable resistor at the temperature $T°$ C., $R_0$ denotes a loadless resistance value Ω of the variable resistor at the reference temperature $T_0$, α denotes a TCR ppm/° C. or ppm/K, T denotes a substantially measured temperature ° C. or K of the variable resistor, and $T_0$ denotes the reference temperature ° C. or K.

For example, if a platinum resistor having a TCR α of 3900 ppm/° C. and a resistance value of 1 kΩ at a room temperature is used as a temperature sensor, it is supposed that a voltage of 1V is applied to both ends of the platinum resistor at a power voltage $V_{DD}$ of 2V and the temperature is increased by 1° C. According to Equation 1, $R(21° C.)=1$ kΩ[1+0.0039] =1.0039 kΩ. In other words, as shown in FIG. 2, the platinum temperature sensor has a resistance of 1 kΩ at a temperature of 20° C. However, a resistance component of 39Ω is added to the resistance value of 1 kΩ at a temperature of 21° C. Thus, the controller 50 controls the digital display 40 to display a temperature of 20° C. when the voltage of 1 V is output but to display a temperature of 21° C. when a voltage of about 1.0019V is output due to a change of the resistance value of the platinum temperature sensor to 1.0039 kΩ.

Such a digital temperature measuring system displays a temperature based on variations in an output voltage caused by variations in a resistance value of a platinum resistor. However, in the digital temperature measuring system, a signal variation in an output voltage caused by variations in the resistance value of the temperature sensor is slight. Thus, the probability that an error occurs is very high. Also, the digital temperature measuring system requires a low noise circuit and a high-performance amplifier for removing DC offset prior to ADC conversion.

SUMMARY OF THE INVENTION

An aspect of the present invention is to provide a digital temperature sensor for digitally displaying a measured temperature without using an ADC so as to reduce power consumption, and a digital temperature measuring system and method using the digital temperature sensor.

According to an aspect of the present invention, there is provided a digital temperature sensor including: a reference signal generator including one or more reference resistance elements; a temperature sensor including a plurality of discrete resistance elements being in parallel with one another; a multiplexer multiplexing the plurality of discrete resistance elements and the reference resistance element of the reference signal generator so that the plurality of discrete resistance elements sequentially distribute a power voltage together with the reference resistance element; a comparator comparing voltages distributed by the reference resistance element and a discrete resistance element selected by the multiplexer; and a counter counting sequential switchings of the multiplexer.

A number of the plurality of discrete resistance elements may be calculated by dividing a range of a temperature to be measured by a resolution and adding by 1. Resistance values of the plurality of discrete resistance elements are calculated in consideration of a temperature coefficient of resistance and the resolution with respect to reference resistance values that are resistance values of one or more reference resistance elements of the reference signal generator.

The resistance value of the reference resistance element is set to be equal to a resistance value of $(N+1)/2^{th}$ discrete resistance element of N discrete resistance elements at the intermediate temperature $T_C$ within the range of the temperature to be measured. The reference resistance element is formed of a same material as the discrete resistance elements are formed, and forms a thermal shield to prevent the variation of the resistance values of the reference resistance elements with respect to change of the external temperature. The reference resistance element is formed of a material having a much lower temperature coefficient of resistance than the discrete resistance elements when the reference resistance element does not form a thermal shield. The reference resistance element and the discrete resistance elements are formed on different layers to substitute the thermal shield in case of manufacturing as an integrated circuit (IC) chip.

According to another aspect of the present invention, there is provided a digital temperature measuring system including: a reference signal generator including one or more reference resistance elements; a temperature sensor including a plurality of discrete resistance elements being parallel with one another; a multiplexer multiplexing the plurality of discrete resistance elements and the reference resistance element of the reference signal generator so that the plurality of discrete resistance elements sequentially distribute a power voltage together with the reference resistance element; a comparator comparing the voltages distributed by the reference resistance element of the reference signal generator and a discrete resistance element selected by the multiplexer; a counter counting sequential switchings of the multiplexer; a memory storing temperature change information as to the discrete resistance elements according to a resolution within a range of a temperature to be measured; and a controller obtaining temperature information corresponding to a discrete resistance element according to a coefficient of the counter obtained when an output of the comparator is transitioned.

The digital temperature measuring system may further include a display displaying a digital temperature. Here, the controller may control the display to display the temperature information.

According to still another aspect of the present invention, there is provided a digital temperature measuring method including: setting temperature change information as to discrete resistance elements being parallel with one another according to a resolution within a range of a temperature to be measured; multiplexing a reference resistance element of a reference signal generator including one or more reference resistance elements and the discrete resistance elements so that the discrete resistance elements sequentially distribute a voltage together with the reference resistance element; counting the sequential multiplexing; comparing voltages distributed by the reference resistance element and a discrete resistance element selected by the multiplexing; and obtaining temperature information measured from temperature change information corresponding to a corresponding discrete resistance element stored in the memory according to a coefficient of the counter obtained when an output of the comparator is transitioned.

As described above, in a digital temperature sensor, and a system and a method for measuring a temperature using the digital temperature sensor, according to the present invention, the temperature can be measured more accurately regardless of insignificance of the output voltage according to the variation of the resistance value of the temperature sensor.

BRIEF DESCRIPTION OF THE DRAWINGS

The above aspects and features of the present invention will be more apparent by describing exemplary embodiments of the present invention with reference to the accompanying drawings, in which:

FIGS. 5 and 6 are tables showing resistance values of discrete resistance elements formed of a thin platinum or titanium at a temperature between 30° C. and 40° C. and at resolutions of 0.2° C. and 0.5° C. according to exemplary embodiments of the present invention.

DETAILED DESCRIPTION OF EXEMPLARY EMBODIMENTS OF THE INVENTION

Figure 1:
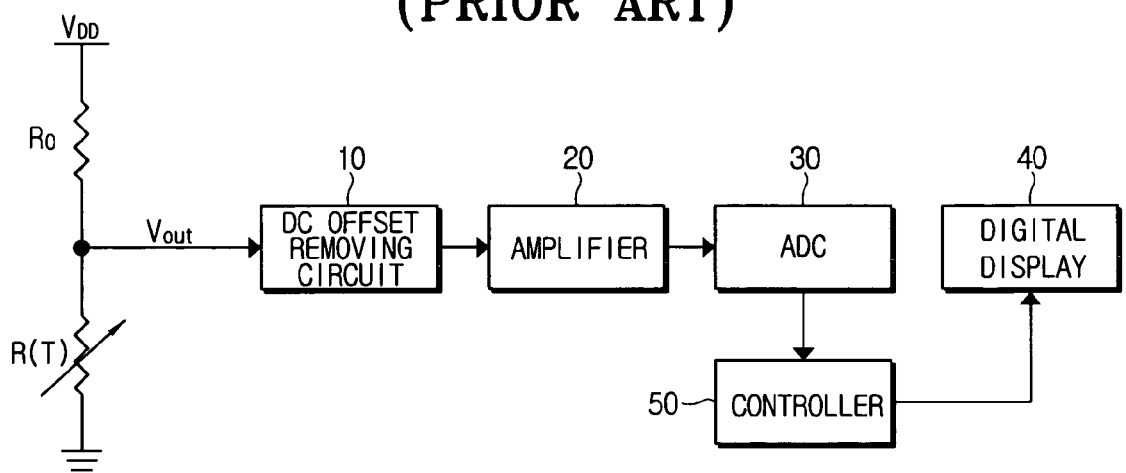
FIG. 1 is a block diagram of a conventional digital temperature measuring system.
Figure 2:
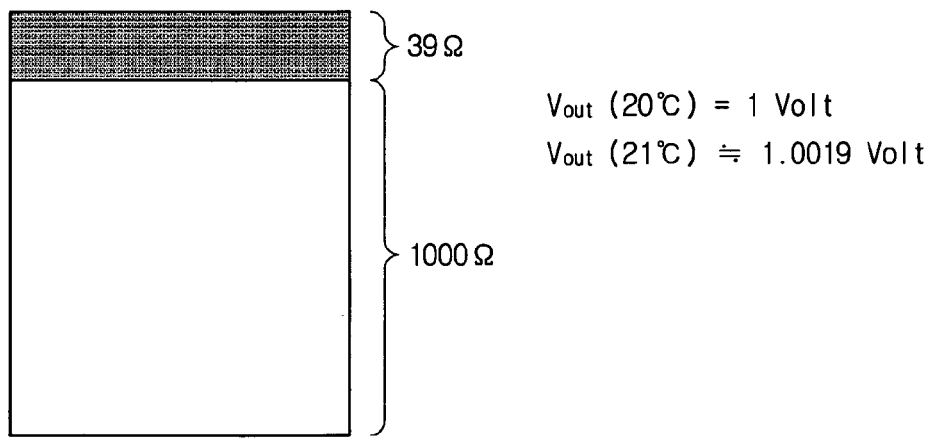
FIG. 2 is a view illustrating a method of measuring a temperature using the conventional digital temperature measuring system shown in FIG. 1.

Exemplary embodiments of the present invention will be described in greater detail with reference to the accompanying drawings.

In the following description, same drawing reference numerals are used for the same elements even in different drawings. The matters defined in the description such as a detailed construction and elements are provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
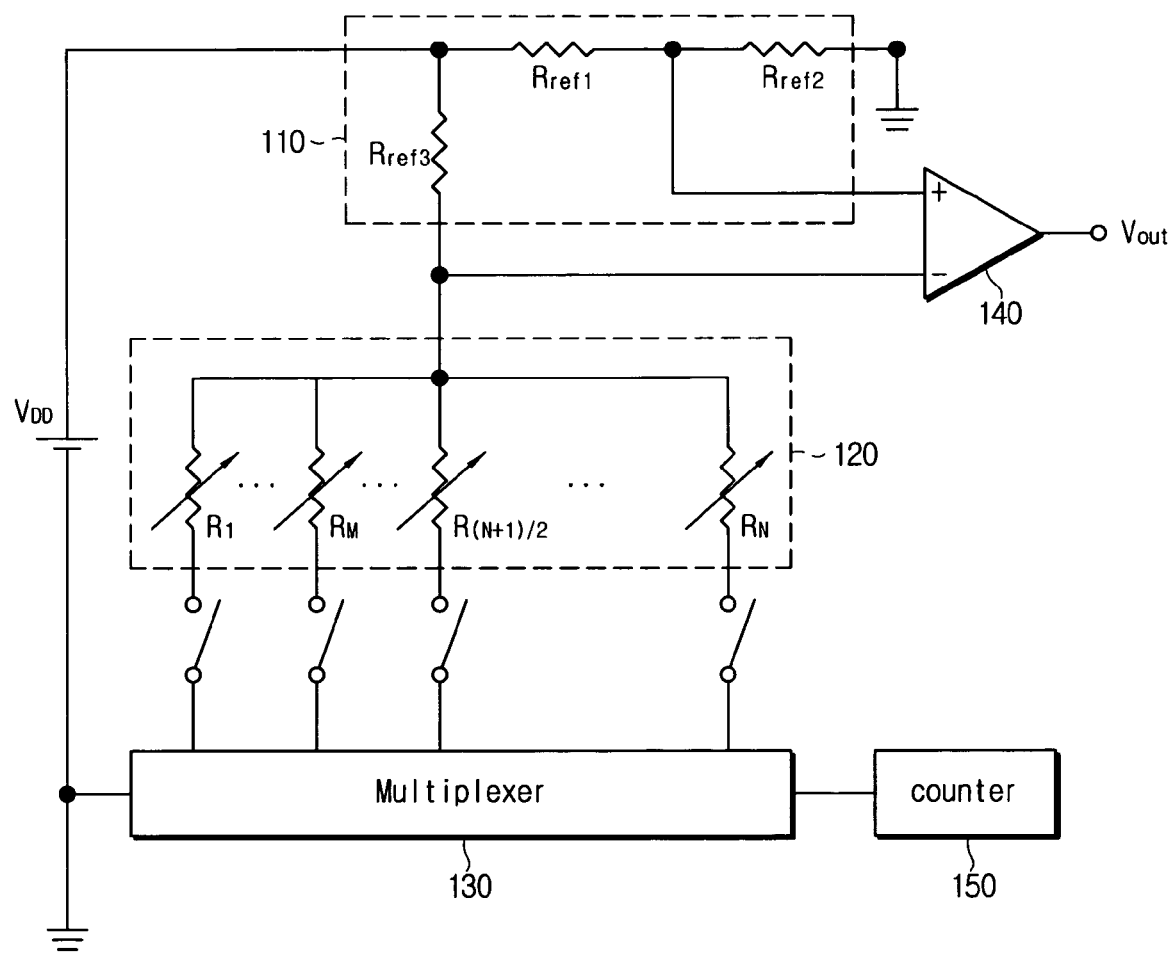
FIG. 3 is a schematic view of a digital temperature sensor according to an exemplary embodiment of the present invention.

FIG. 3 is a schematic view of a digital temperature sensor according to an exemplary embodiment of the present invention. The digital temperature sensor includes a reference signal generator 110, a temperature sensor 120, a multiplexer 130, a comparator 140, and a counter 150.

The reference signal generator 110 includes first and second reference resistance elements $R_{ref1}$ and $R_{ref2}$ splitting a power voltage $V_{DD}$ and a third reference resistance element $R_{ref3}$ having the same resistance value as the first and second reference resistance elements $R_{ref1}$ and $R_{ref2}$ and being in parallel with the first and second reference resistance elements $R_{ref1}$ and $R_{ref2}$. The first, second, and third reference resistance elements $R_{ref1}$, $R_{ref2}$ and $R_{ref3}$ may have resistance values corresponding to a resistance value of an intermediate discrete resistance element of discrete resistance elements $R_1$ through $R_N$ at an intermediate temperature $T_c$ within a range of the temperature to be measured, i.e., at a temperature of $(T_{max}+T_{min})/2$. Also, the first, second, and third reference resistance elements $R_{ref1}$, $R_{ref2}$ and $R_{ref3}$ may be made of the same material as the discrete resistance elements $R_1$ through $R_N$ to form a thermal shield so as to minimize variations in the resistance values of the first, second, and third reference resistance elements caused by variations in an external temperature. As a result, measuring a temperature according to the present invention may be achieved. Alternatively, the first, second, and third reference resistance elements $R_{ref1}$, $R_{ref2}$ and $R_{ref3}$ may be made of a material having a lower TCR than the discrete resistance elements $R_1$ through $R_N$ without forming the thermal shield so as to minimize the variations in the resistance values of the first, second, and third reference resistance elements $R_{ref1}$, $R_{ref2}$ and $R_{ref3}$ caused by the variations in the external temperature.

The temperature sensor 120 includes the discrete resistance elements $R_1$ through $R_N$ arranged in parallel with one another. The discrete resistance elements $R_1$ through $R_N$ are formed to be connected to the third reference resistance element of the reference signal generator in series. The discrete resistance elements $R_1$ through $R_N$ may be formed of a material having a great TCR so that variations in their resistance values greatly vary in the external temperature. A number, N, of discrete resistance elements is determined depending on the range of the temperature to be measured and resolution and can be calculated as in Equation 2:

$$N = \left[\frac{(T_{max} - T_{min})}{\Delta T}\right] + 1 \quad \text{[Equation 2]}$$

where N denotes the number of discrete resistance elements, $T_{max}$ denotes a maximum temperature ° C. or K within the range of the temperature to be measured, $T_{min}$ denotes a minimum temperature ° C. or K within the range of the temperature to be measured, and $\Delta T$ denotes a minimum temperature difference to be measured (temperature resolution).

In addition, the temperature sensor 120 may further include dummy resistance elements to facilitate the measurement.

The resistance values of the discrete resistance elements $R_1$ through $R_N$ can be calculated according to integer times of a temperature measurement resolution as in Equation 3:

$$R_m = \frac{R_{ref}}{1 \pm a\left(m - \frac{N+1}{2}\right)(\Delta T)} \qquad \text{[Equation 3]}$$

where $R_m$ denotes a resistance value of $m^{th}$ discrete resistance element at the temperature $T_c$, i.e., $(T_{max}+T_{min})/2$, $R_{ref}$ denotes a reference resistance value of a reference resistance element, N denotes the number of discrete resistance elements, and $\Delta T$ denotes the minimum temperature difference to be measured (temperature resolution).

The multiplexer 130 multiplexes ends of the discrete resistance elements $R_1$ through $R_N$ to sequentially distribute the power voltage $V_{DD}$ together with the third reference resistance element $R_{ref3}$ of the reference signal generator 110.

The comparator 140 compares a voltage distributed by the third reference resistance element $R_{ref3}$ and a discrete resistance element selected by the multiplexer 130 with a voltage distributed by the first and second reference resistance elements $R_{ref1}$ and $R_{ref2}$. Thus, an output voltage is on a low or high level depending on a signal of a difference between the voltages.

The counter 150 counts sequential switchings of the multiplexer 130 with respect to the discrete resistance elements $R_1$ through $R_N$.

In the digital temperature sensor, the third reference resistance element $R_{ref3}$ and the discrete resistance elements $R_1$ through $R_N$ sequentially constitute a closed loop according to sequential multiplexing of the multiplexer 130 with respect to the discrete resistance elements $R_1$ through $R_N$ depending on variations in temperature. The closed loop distributes the power voltage $V_{DD}$ via the third reference resistance element $R_{ref3}$ and the discrete resistance elements $R_1$ through $R_N$. Thus, the comparator 140 sequentially compares a reference voltage distributed by the first and second reference resistance elements $R_{ref1}$ and $R_{ref2}$ of the reference signal generator 110 that are not affected or are insensitive to variations in an arbitrary temperature within the range of the temperature to be measured, with a sensing voltage distributed by the third reference resistance element $R_{ref3}$ of the reference signal generator 110 and the discrete resistance elements that are sensitive to the variations in the temperature. If the sensing voltage is greater than the reference voltage, a signal output from the comparator 140 is transitioned from a low level to a high level or from a high level to a low level according to the arrangement order of the discrete resistance elements and a an operation method of the comparator 140. The counter 150 counts the sequential multiplexing of the multiplexer 130 with respect to the discrete resistance elements $R_1$ through $R_N$. Count information provides information as to the turns of the discrete resistance elements $R_1$ through $R_N$ determined when the signal output from the comparator 140 is transitioned. As a result, the information as to the turns provides information as to changes in temperatures of the discrete resistance elements $R_1$ through $R_N$ made when the signal output from comparator 140 is transitioned. The information as to the changes in the temperatures offers temperature information corresponding to the discrete resistance elements $R_1$ through $R_N$ preset in the digital temperature measuring system.

Figure 4:
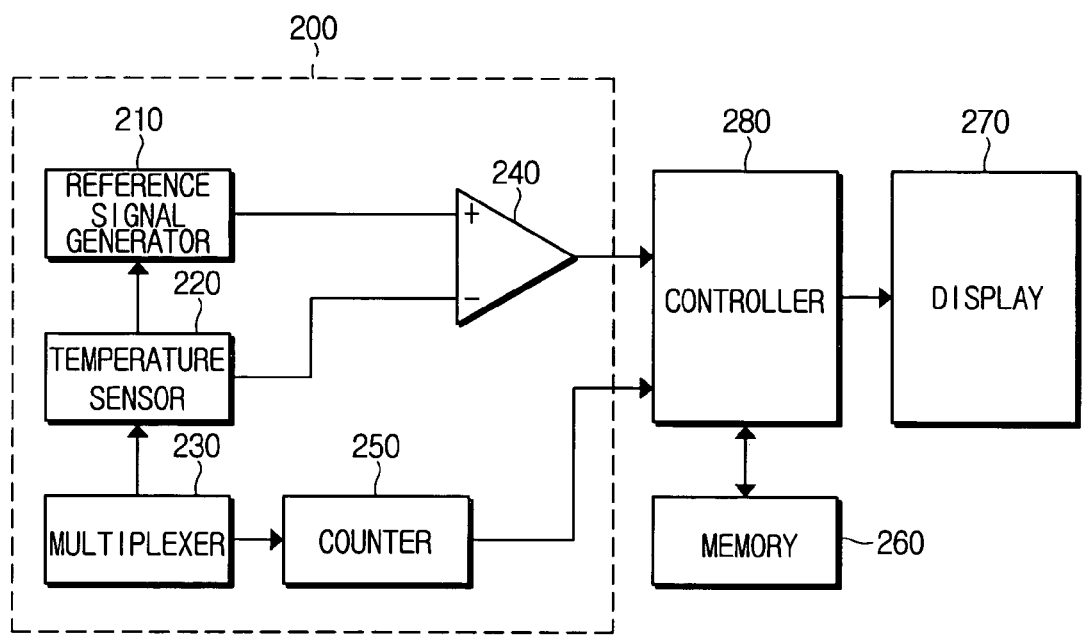
FIG. 4 is a schematic block diagram of a digital temperature measuring system using the digital temperature sensor shown in FIG. 3.

FIG. 4 is a schematic block diagram of a digital temperature measuring system using the digital temperature sensor shown in FIG. 3. The digital temperature measuring system includes a sensor 200, a memory 260, a display 270, and a controller 280.

The sensor 200 includes a reference signal generator 210, a temperature sensor 220, a multiplexer 230, a comparator 240, and a counter 250.

The memory 260 stores temperature change information of each discrete resistance element according to a resolution within the range of the temperature to be measured.

The display 270 displays a digital temperature.

The controller 280 controls the digital temperature measuring system to obtain from the memory 260 temperature information corresponding to the temperature change information of the discrete resistance elements according to a coefficient of the counter 250 calculated when an output of the comparator 240 is transitioned and to display the temperature information on the display 270.

In the digital temperature measuring system, the count information obtained when a level of the output of the comparator 240 is transitioned is transmitted to the controller 280. The temperature information corresponding to the temperature change information may be obtained from the information as to the turns of the discrete resistance elements obtained from the count information. In other words, there is a discrete resistance element having the same resistance value as a reference resistance value at a specific temperature T° C. within the range of the temperature to be measured, the discrete resistance element belonging to the discrete resistance elements having resistance values varying as in Equation 3. Also, if the temperature is increased by $\Delta T$, the resistance values of the discrete resistance elements are increased according to Equation 1. Thus, a resistance value of a discrete resistance element neighboring the discrete resistance element having the same resistance value as the reference resistance value at the specific temperature T° C. becomes equal to the reference resistance value. As a result, variations in the temperature may be measured from variations in the resistance values of the discrete resistance elements. In other words, a minimum temperature may be measured from temperature change information corresponding to the first resistance element of the discrete resistance elements within the range of the temperature to be measured. Also, when the temperature rises, temperature change information corresponding to a discrete resistance element in its turn to transit the level of the output of the comparator 240 is searched from the memory 260 to measure the corresponding temperature.

FIG. 5 is a table showing variations in resistance values of discrete resistance elements formed of thin platinum at a temperature between 30° C. and 40° C. and at a resolution of 0.2° C., according to an exemplary embodiment of the present invention. A total of 51 discrete resistance elements were formed, their minimum and maximum lengths were respectively 7494 μm and 7794 μm, a nonresistance was 74 μΩ×cm, a TCR was 3800 ppm/cm, their thickness was 300 Å, their width was 2 μm, and a reference resistance value was 100 kΩ. Table of FIG. 5 shows resistance values of first through eighth resistance elements R_01 through R_08 varying at each temperature when a temperature is changed at a temperature difference of 0.2° C. within a temperature range between 30° C. and 31.6° C.

The operation of the digital temperature measuring system will now be described with reference to FIG. 5. The resistance value of the first resistance element is equal to the reference resistance value, i.e., is 100000.0Ω, at a minimum temperature of 30° C. within the range of the temperature to be measured. The resistance values of the other resistance elements are smaller than the reference resistance value. In a case where the temperature is increased to 31° C., a level of a signal output from the comparator 240 does not vary up to the fifth resistance element R_05 but varies when the sixth resistance element R_06 is multiplexed. The counter 250 transmits counter information "6" to the controller 280. The controller 280 obtains temperature information corresponding to temperature change information corresponding to the sixth resistance element R_06 stored in the memory 260, i.e., 31° C., from the count information "6". The controller 280 displays the obtained temperature information on the display 270.

FIG. 6 is a table showing variations in resistance values of discrete resistance elements formed of thin titanium at a temperature between 30° C. and 40° C. and at a resolution of 0.5° C., according to an exemplary embodiment of the present invention. 21 discrete resistance elements were formed, their minimum and maximum lengths were respectively 769.2 μm and 789.5 μm, a nonresistance was 74 μΩ×cm, a TCR was 2600 ppm/° C., their thickness was 500 Å, their width was 2 μm, and a reference resistance value was 6 kΩ. Resistance values of the discrete resistance elements varying with a resolution within a range of a temperature to be measured are 6000.0 at a corresponding temperature, i.e., are equal to a preset resistance value of a reference resistance element.

As described above, in a digital temperature sensor, and a system and a method for measuring a temperature using the digital temperature sensor, according to the present invention, a component generating heat in the system can be structurally compensated. Also, a measured temperature can be digitally displayed without an ADC. Thus, a circuit deciphering the temperature can be simplified.

Moreover, the digital temperature sensor and the system can easily measure the temperature at a low power.

Furthermore, the digital temperature sensor can be integrated using a Micro Electro Mechanical System (MEMS) process.

The foregoing exemplary embodiment and advantages are merely exemplary and are not to be construed as limiting the present invention. The present invention can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A digital temperature sensor comprising:
   a reference signal generator comprising at least one reference resistance element;
   a temperature sensor comprising a plurality of discrete resistance elements connected in parallel with one another;
   a multiplexer which multiplexes the plurality of discrete resistance elements and the reference resistance element so that the plurality of discrete resistance elements sequentially distribute a power voltage together with the reference resistance element;
   a comparator which compares voltages distributed by the reference resistance element and a discrete resistance element selected from among the plurality of discrete resistance elements by the multiplexer; and
   a counter which counts sequential switchings of the multiplexer.

2. The digital temperature sensor of claim 1, wherein a number N of the discrete resistance elements is calculated as:

$$N = \left[\frac{(T_{max} - T_{min})}{\Delta T}\right] + 1$$

where $T_{max}$ denotes a maximum temperature within a range of a temperature to be measured, $T_{min}$ denotes a minimum temperature within the range of the temperature to be measured, and $\Delta T$ denotes a minimum temperature difference to be measured.

3. The digital temperature sensor of claim 2, wherein resistance values of the plurality of discrete resistance elements are calculated as:

$$R_m = \frac{R_{ref}}{1 \pm \alpha\left(m - \frac{N+1}{2}\right)(\Delta T)}$$

where $R_m$ denotes a resistance value of an $m^{th}$ discrete resistance element at an intermediate temperature $T_c$ within the range of the temperature to be measured, the temperature $T_c$ corresponds to $(T_{max}+T_{min})/2$, and $R_{ref}$ denotes the reference resistance value, m is an integer, and α denotes a temperature coefficient of resistance ppm/° C. or ppm/K.

4. The digital temperature sensor of claim 3, wherein the resistance value of the reference resistance element is set to be equal to a resistance value of a $(N+1)/2^{th}$ discrete resistance element of the N discrete resistance elements at the intermediate temperature $T_c$ within the range of the temperature to be measured.

5. The digital temperature sensor of claim 4, wherein the reference resistance element and the discrete resistance elements are formed of a same material, and the reference resistance element forms a thermal shield.

6. The digital temperature sensor of claim 4, wherein the reference resistance element is formed of a material having a lower temperature coefficient of resistance than the discrete resistance elements when the reference resistance element does not form a thermal shield.

7. The digital temperature sensor of claim 5, wherein the reference resistance element and the discrete resistance elements are formed on different layers.

8. The digital temperature sensor of claim 6, wherein the reference resistance element and the discrete resistance elements are formed on different layers.

9. A digital temperature measuring system comprising:
   a reference signal generator comprising at least one reference resistance element;
   a temperature sensor comprising a plurality of discrete resistance elements connected in parallel with one another;
   a multiplexer which multiplexes the plurality of discrete resistance elements and the reference resistance element so that the plurality of discrete resistance elements sequentially distribute a power voltage together with the reference resistance element;
   a comparator which compares voltages distributed by the reference resistance element and a discrete resistance element selected from among the plurality of discrete resistance elements by the multiplexer;
   a counter which counts sequential switchings of the multiplexer;
   a memory which stores temperature change information as to the discrete resistance elements according to a minimum temperature difference to be measured within a range of a temperature to be measured; and
   a controller which obtains from the memory temperature information corresponding to a discrete resistance element according to a coefficient of the counter obtained when an output of the comparator is transitioned.

10. The digital temperature measuring system of claim 9, further comprising a display which displays a digital temperature, wherein the controller controls the display to display the temperature information.

11. The digital temperature measuring system of claim 9, wherein a number N of the discrete resistance elements is calculated as:

$$N = \left[\frac{(T_{max} - T_{min})}{\Delta T}\right] + 1$$

where $T_{max}$ denotes a maximum temperature within the range of the temperature to be measured, $T_{min}$ denotes a minimum temperature within the range of the temperature to be measured, and $\Delta T$ denotes the minimum temperature difference to be measured.

12. The digital temperature measuring system of claim 11, wherein resistance values of the plurality of discrete resistance elements are calculated as:

$$R_m = \frac{R_{ref}}{1 \pm \alpha\left(m - \frac{N+1}{2}\right)(\Delta T)}$$

where $R_m$ denotes a resistance value of an $m^{th}$ discrete resistance element at an temperature $T_c$ within the range of the temperature to be measured, the temperature $T_c$ corresponds to, $(T_{max}+T_{min})/2$, and $R_{ref}$ denotes the reference resistance value, m is an integer and α denotes a temperature coefficient of resistance ppm/° C. or ppm/K.

13. The digital temperature measuring system of claim 12, wherein the resistance value of the reference resistance element is set to be equal to a resistance value of an $(N+1)/2^{th}$ discrete resistance element of the N discrete resistance elements at the intermediate temperature $T_c$ within the range of the temperature to be measured.

14. The digital temperature measuring system of claim 12, wherein the reference resistance element and the discrete resistance elements are formed of a same material as, and the reference resistance element forms a thermal shield.

15. The digital temperature measuring system of claim 12, wherein the reference resistance element is formed of a material having a lower temperature coefficient of resistance than the discrete resistance elements when the reference resistance element does not form a thermal shield.

16. The digital temperature measuring system of claim 14, wherein the reference resistance element and the discrete resistance elements are formed on different layers.

17. The digital temperature measuring system of claim 15, wherein the reference resistance element and the discrete resistance elements are formed on different layers.

* * * * *